United States Patent
Kikuchi et al.

(10) Patent No.: US 8,254,388 B2
(45) Date of Patent: Aug. 28, 2012

(54) MANAGEMENT DEVICE TO INVESTIGATE PATH STATES OF NETWORK AND NETWORK SYSTEM

(75) Inventors: Shunsuke Kikuchi, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 11/585,285

(22) Filed: Oct. 24, 2006

(65) Prior Publication Data

US 2007/0280244 A1 Dec. 6, 2007

(30) Foreign Application Priority Data

Jun. 5, 2006 (JP) .................................. 2006-155724

(51) Int. Cl.
*H04L 12/56* (2006.01)
(52) U.S. Cl. .......................... 370/392; 370/252; 370/229
(58) Field of Classification Search .................. 370/351, 370/352, 392, 229
See application file for complete search history.

(56) References Cited

U.S. PATENT DOCUMENTS

| | | | | |
|---|---|---|---|---|
| 6,510,461 | B1 * | 1/2003 | Nielsen | 709/224 |
| 6,826,172 | B1 * | 11/2004 | Augart | 370/351 |
| 7,260,645 | B2 * | 8/2007 | Bays | 709/238 |
| 7,724,679 | B2 | 5/2010 | Shimada | |
| 2003/0161265 | A1 * | 8/2003 | Cao et al. | 370/229 |
| 2004/0017814 | A1 | 1/2004 | Shimada | |
| 2005/0232239 | A1 * | 10/2005 | Ilnicki et al. | 370/352 |
| 2006/0239199 | A1 * | 10/2006 | Blair et al. | 370/248 |

FOREIGN PATENT DOCUMENTS

| | | |
|---|---|---|
| JP | 2000-244563 | 9/2000 |
| JP | 2004-88747 | 3/2004 |
| JP | 2005-312033 | 11/2005 |

OTHER PUBLICATIONS

Japanese Office Action issued Feb. 8, 2011 in corresponding Japanese Patent Application 2006-155724.

* cited by examiner

*Primary Examiner* — Dang Ton
*Assistant Examiner* — Pamit Kaur
(74) *Attorney, Agent, or Firm* — Staas & Halsey LLP

(57) ABSTRACT

A packet reception portion receives packets of user traffic transferred on the network. The received packets are transferred to an address extraction portion via a distribution portion, and the transmission source address and destination address are extracted. Based on these addresses, a packet generation portion generates probe packets the transfer destination of which is the address destination. A packet transmission portion transmits the probe packets to the network. The transmitted probe packets are received as probe response packets by the packet reception portion. The probe response packets received by the packet reception portion are transferred to a result storage portion via the distribution portion. The result storage portion stores transmission source addresses included in the probe packets in a result storage DB.

12 Claims, 15 Drawing Sheets

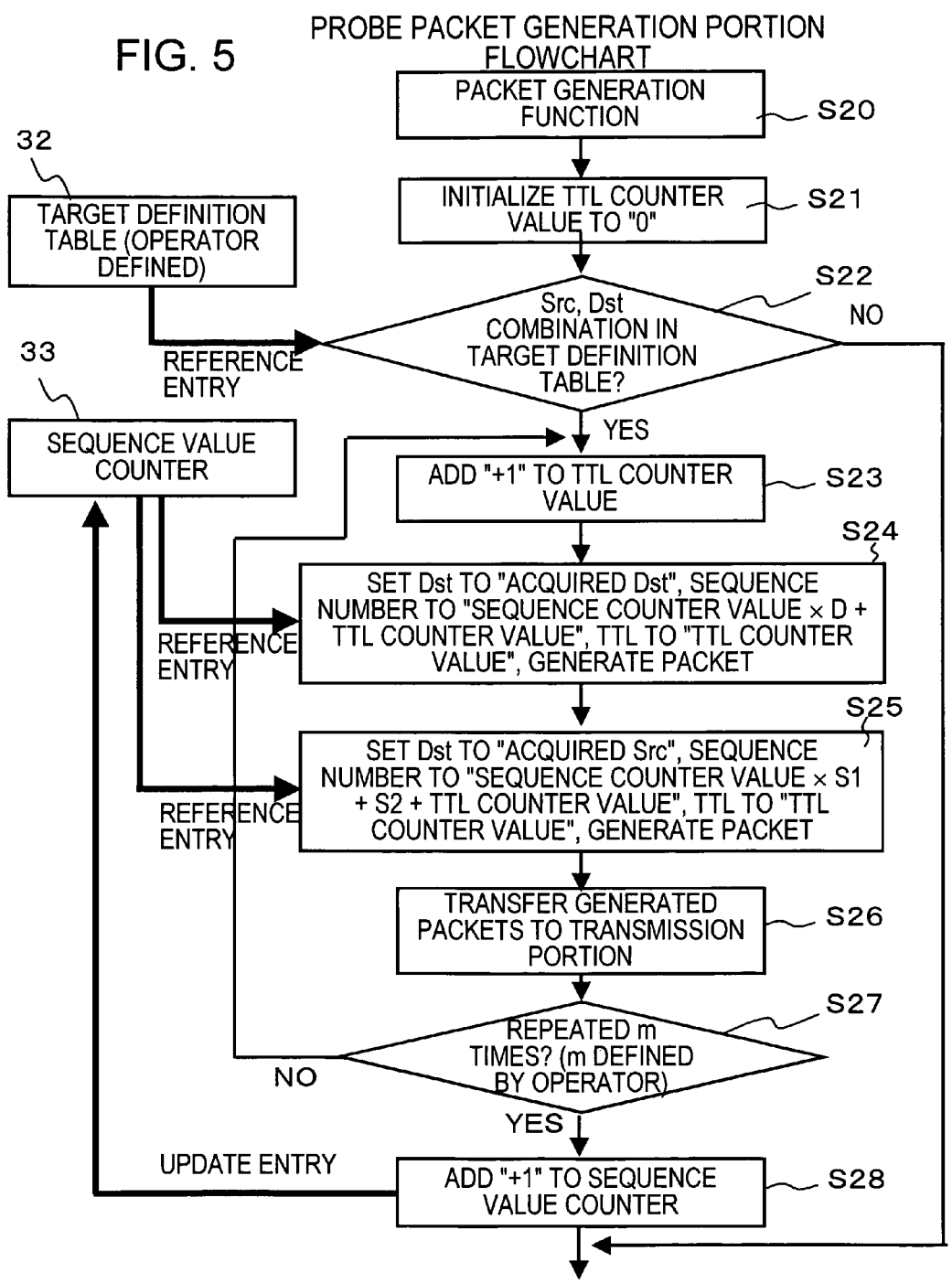

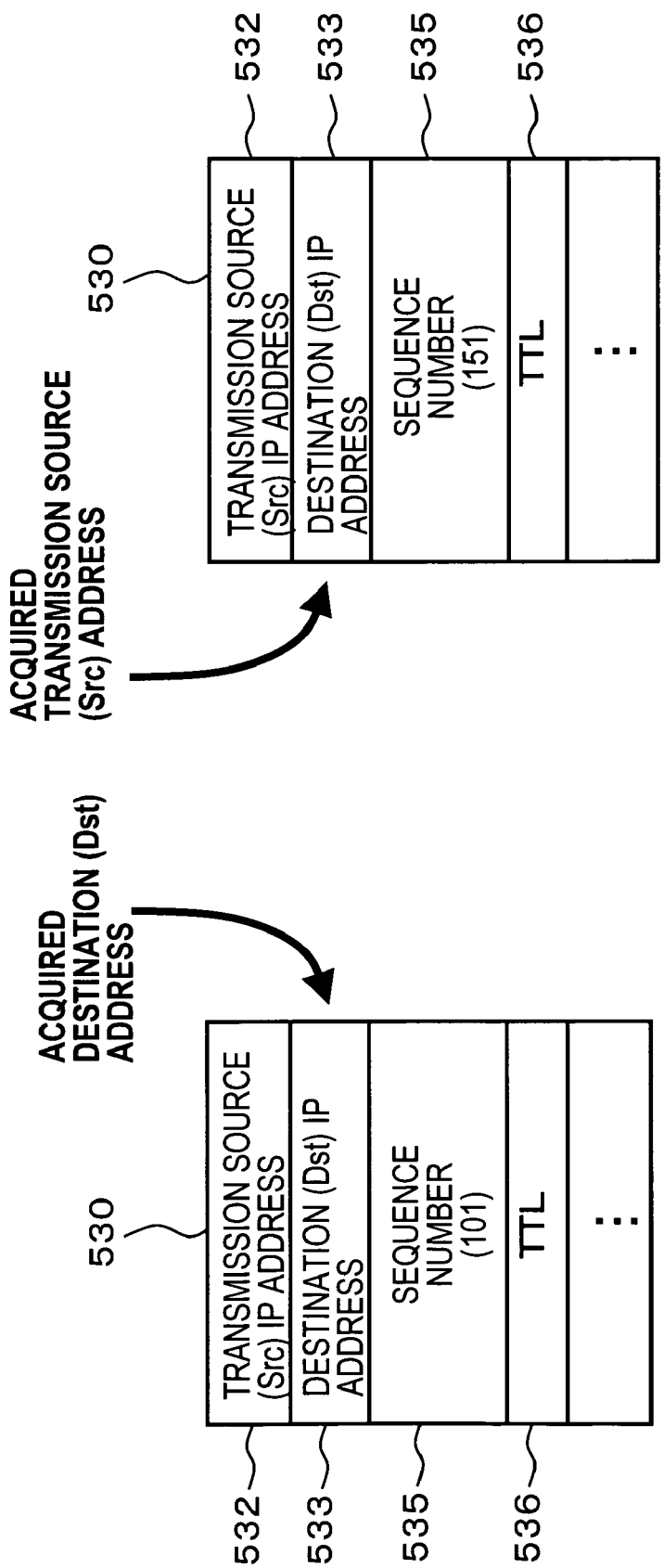

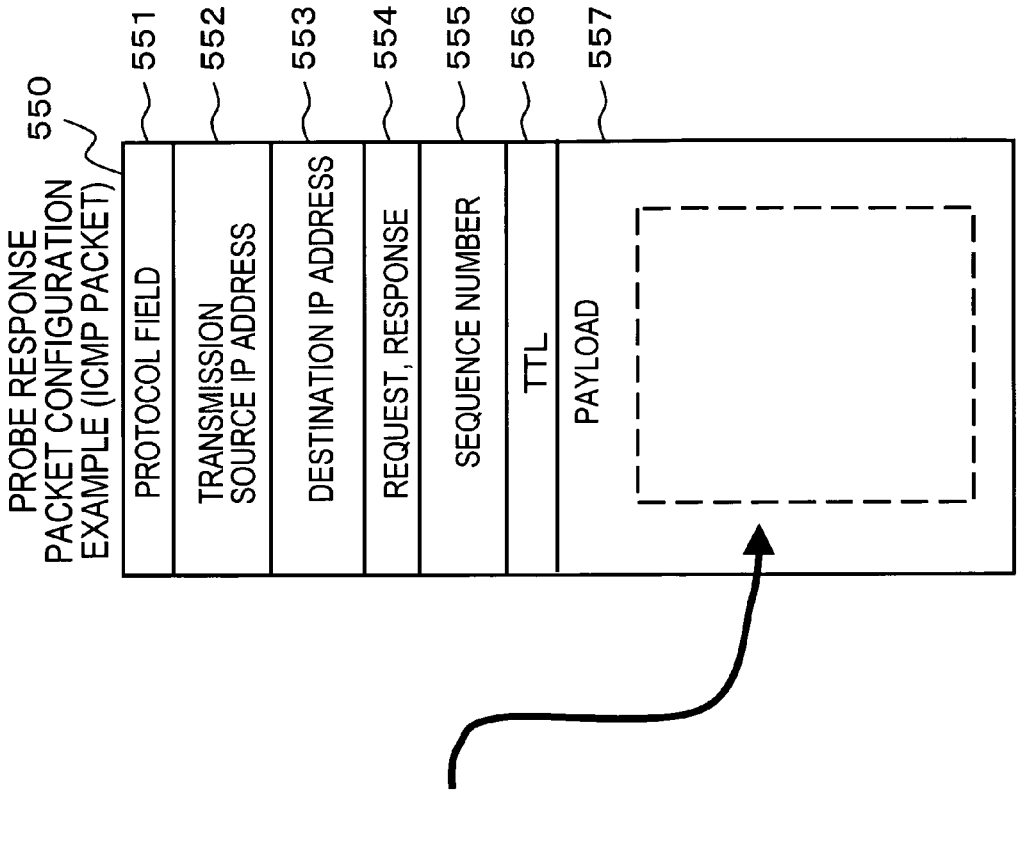
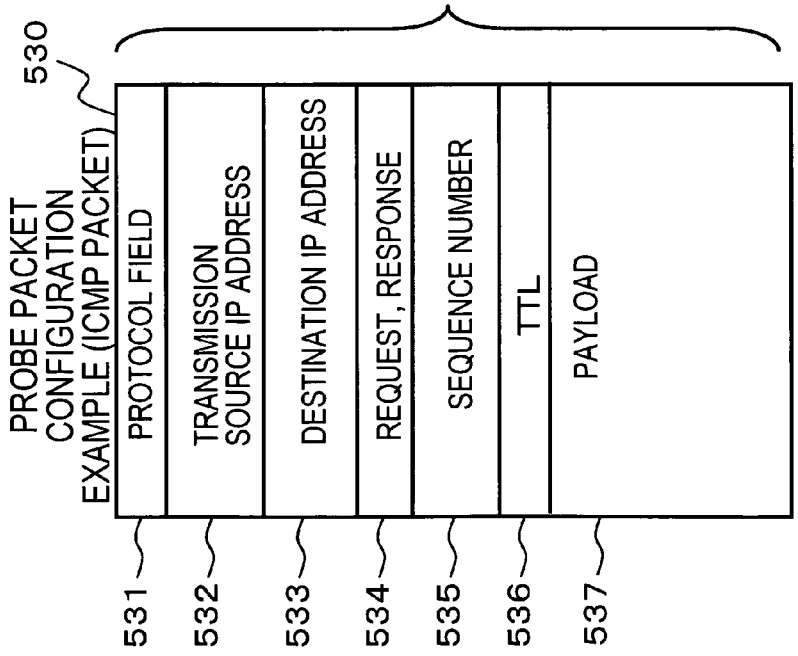

FIG. 9 CONFIGURATION OF RESULT STORAGE DATABASE

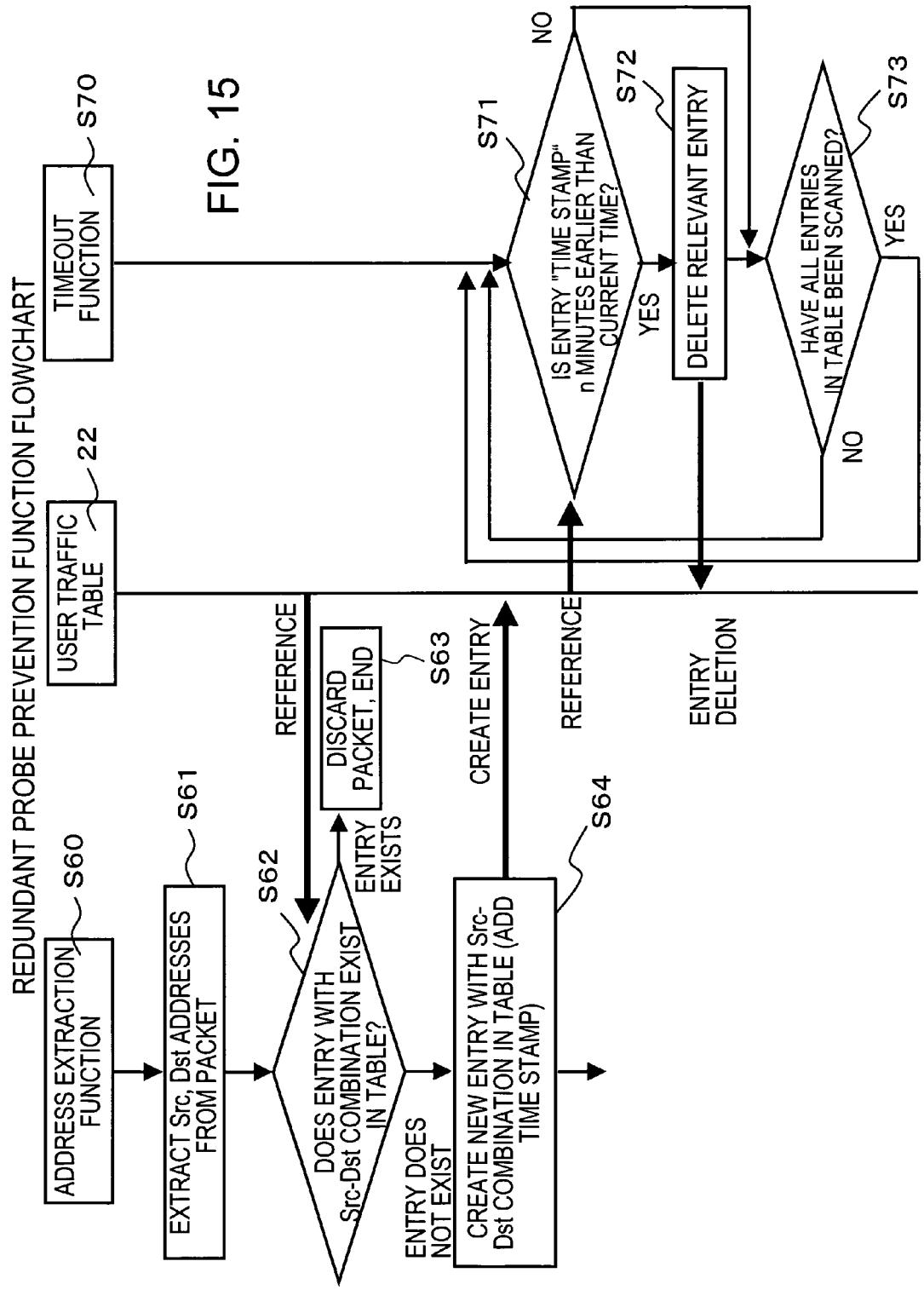

MANAGEMENT DEVICE TO INVESTIGATE PATH STATES OF NETWORK AND NETWORK SYSTEM

CROSS-REFERENCE TO RELATED APPLICATIONS

This application is based upon and claims the benefit of priority from the prior Japanese Patent Application No. 2006-155724, filed on Jun. 5, 2006, the entire contents of which are incorporated herein by reference.

BACKGROUND OF THE INVENTION

1. Field of the Invention

This invention relates to a management device to investigate the path states of a network, and to such a network system. More specifically, this invention relates to a management device or the like capable of immediate acquisition of path states of the network, and also capable of detecting path changes.

2. Description of the Related Art

In the prior art, the traceroute command is a command which ascertains path states in a network.

By starting the traceroute command, packets are transmitted to a destination address with a TTL (Time To Live: a time of expiration for the packet) increased in succession from "1". The network nodes which are one hop, two hops, and so on counting from the terminal which has issued this command return packets indicating a timeout error, in accordance with the TTL value. By increasing the TTL in succession until the terminal at the destination address returns this packet, the path therebetween can be elucidated.

In another technology of the prior art, a format signal with a flag indicating path tracing is transmitted from a command-issuing terminal, and each node appends the receiving port address and the transmitting port address and transmits the format signal to the next node, so that the transmission path is traced from the connection of accumulated appended receiving port and transmitting port addresses (see for example Japanese Patent Laid-open No. 2000-244563).

Further, a method has been disclosed in which a dynamic packet filter is set along a path using transmitted filter setting packets, and the collection of data detected by the filter is used to trace actual packets in the network, to acquire path information (see for example Japanese Patent Laid-open No. 2005-312033).

However, the traceroute command must be issued by a network operator or user (hereafter "network operator or similar") who operates a terminal himself. Originally, this command is a command issued by a network operator or similar after a network fault has been recognized by some method. Hence except in cases in which this command is issued at the time of occurrence of a fault, it is difficult to acquire the path state at the time of occurrence of a fault.

A script or other means may conceivably be used to automate, to a certain degree (for example, at fixed times), issuing of the traceroute command. However, similarly to the above problem, if the command is not issued at the time of occurrence of a fault, then it is difficult to acquire the path state at the time of occurrence of a fault.

Moreover, the traceroute command is a command limited to a particular set of circumstances, and does not compare the results preceding and following each packet issued by starting the command to ascertain path changes. Hence even when there is a path change, this command cannot notify the network operator or similar of this fact.

On the other hand, in the case of the methods disclosed in Japanese Patent Laid-open No. 2000-244563 and Japanese Patent Laid-open No. 2005-312033, the network operator or similar himself must operate the terminal in order to issue format signal or filter setting packet, and it is difficult to acquire the path state at the time of fault occurrence.

SUMMARY OF THE INVENTION

An object of the invention is to provide a management device, management method, program, and network system capable of immediate acquisition of path states in a network according to user traffic.

Another object of the invention is to provide a management device and similar capable of detecting path changes in the network.

In order to attain the above objects, according to one implementation of the invention, a management device which investigates path states in a network having a packet transmission and reception portion which receives traffic from the network; an address extraction portion which extracts address information from the received traffic; and a probe packet generation portion which generates probe packets the transmission destination of which is the extracted address information, wherein the packet transmission and reception portion transmits the generated probe packets to the network, and receives probe response packets for the probe packets transmitted along paths of the network over which the traffic is transferred.

According to another implementation of the invention, the management device further having a result storage portion which creates path information from the probe response packets and stores the path information.

According to another implementation of the invention, the management device, wherein the result storage portion compares first path information which has been stored with second path information created from newly received the probe response packets, and detects changes in the paths of traffic transferred over the network.

According to another implementation of the invention, the management device, wherein the address extraction portion stores the extracted address information, and when the stored information is the same as the address information extracted from the newly received traffic, the probe packet generation portion is not caused to generate the probe packet.

According to another implementation of the invention, the management device, wherein that the address extraction portion deletes the stored address information after a fixed length of time has elapsed.

According to another implementation of the invention, the management device, wherein the packet transmission and reception portion receives the probe response packets, and in addition receives the probe packets by means of a loopback function without transferring packets to the network, and the result storage portion creates the path information from the probe response packets and from the probe packets received by the loopback function.

According to another implementation of the invention, the management device, wherein the probe packet generation portion generates the probe packets with the number of hops set in advance for the extracted address information.

According to another implementation of the invention, the management device, wherein the probe packet generation portion adds a different identifier for each probe packet to the generated probe packets.

According to another implementation of the invention, the management device, wherein the identifier includes a unique sequence number for each target, which is the transmission destination of the probe packet, and a value indicating the number of hops for the probe packet to be transmitted.

According to another implementation of the invention, the management device, wherein the result storage portion summarizes and saves the probe response packets for which the sequence number is the same, in the same entry.

According to another implementation of the invention, the management device, wherein address information for the target to which the probe packet is transmitted is included in the probe response packet, and the address information is included in the entry in the result storage portion.

In order to attain the above objects, according to another implementation of the invention, a management method which investigates path states in a network, having the steps of: receiving traffic from the network; extracting address information from the received traffic; generating probe packets the transmission destination of which is the extracted address information; and, transmitting the generated probe packets to the network, and receiving probe response packets for the probe packets, transmitted along paths of the network over which the traffic is transferred.

In order to attain the above objects, according to another implementation of the invention, a management program which investigates path state in a network, which causes a computer to execute: a processing to receive traffic from the network; a processing to extract address information from the received traffic; a processing to generate probe packets the transmission destination of which is the extracted address information; and, a processing to transmit the generated probe packets to the network, and to receive probe response packets for the probe packets, transmitted along paths of the network over which the traffic is transferred.

In order to attain the above objects, according to another implementation of the invention, a network system, in which terminals and servers are connected via a network, and a management device which investigates path states in the network is connected to the network, wherein the management device having a packet transmission and reception portion which receives traffic transferred from the terminals to the servers; an address extraction portion which extracts address information from the received traffic, and a probe packet generation portion which generates probe packets the transmission destination of which is the extracted address information, and the packet transmission and reception portion transmits the generated probe packets to the network, and receives probe response packets for the probe packets transmitted along paths of the network over which the traffic is transferred.

By means of this invention, a management device, management method, program, and management system capable of immediate acquisition of path states of the network according to user traffic can be provided. Further, according to this invention, a management device and similar capable of detecting path changes in the network can be provided.

BRIEF DESCRIPTION OF THE DRAWINGS

FIG. 5 is an example of a flowchart showing the operation of processing in a probe packet generation portion;

FIG. 6A and FIG. 6B show examples of probe packets;

FIG. 7A shows an example of a probe packet;

FIG. 7B shows an example of a probe response packet;

DESCRIPTION OF THE PREFERRED EMBODIMENTS

Figure 1:
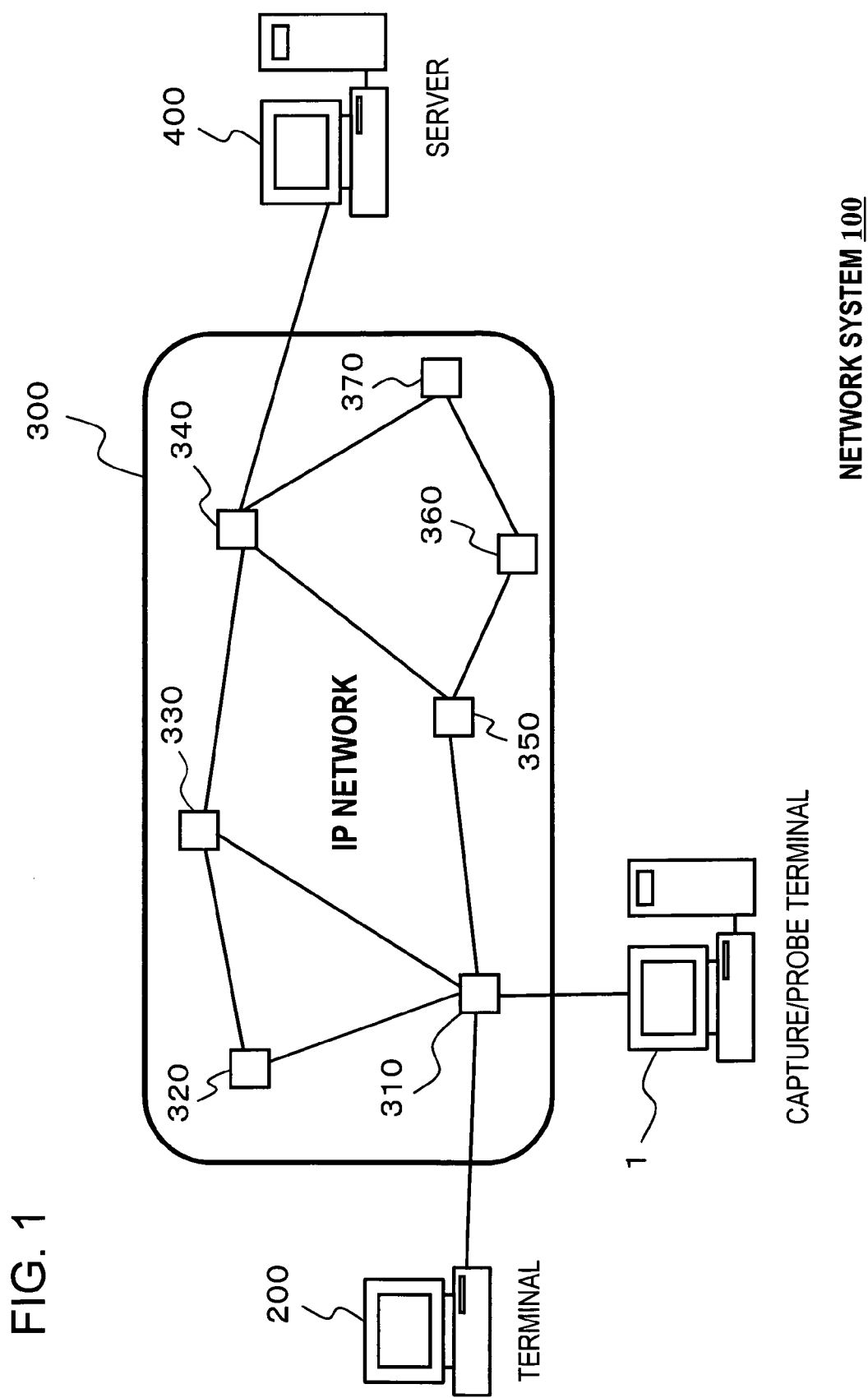
FIG. 1 shows an example of the configuration of a network system.

Below, preferred aspects to implement the invention are explained, referring to the drawings.

(Embodiment 1)

First, Embodiment 1 is explained. Embodiment 1 is an example in which traffic (or packet data) transferred over a network is captured, probe packets having the same addresses as the packets are caused to be transferred over the network substantially simultaneously with the traffic transfer, and by saving the response packets or similar, path states can be immediately acquired.

FIG. 1 shows an example of the configuration of a network system 100 in which Embodiment 1 is applied. The network system 100 has a capture/probe terminal (hereafter called a "capture terminal") 1, a terminal 200, and a server 400. The capture terminal 1 and other components are interconnected by an IP (Internet Protocol) network 300.

The IP network 300 has a plurality of nodes 310 to 370, which are interconnected by paths as shown in FIG. 1.

Figure 2:
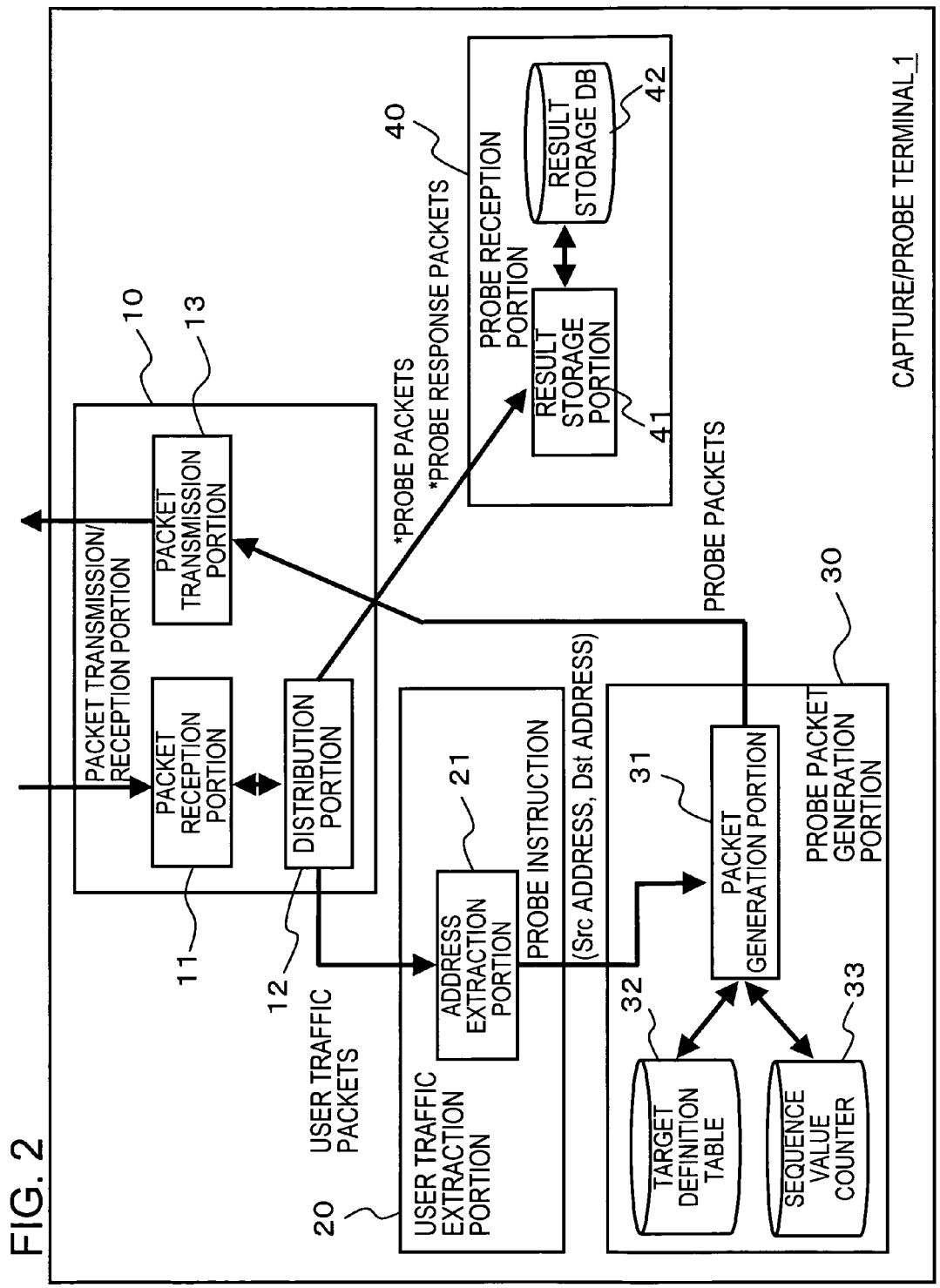
FIG. 2 shows an example of the configuration of a capture/probe terminal.

FIG. 2 shows an example of the configuration of the capture terminal 1. The capture terminal 1 has a packet transmission and reception portion 10, user traffic extraction portion 20, probe packet generation portion 30, and probe reception portion 40. This capture terminal 1 serves the role of a management device which investigates state paths of the network.

The packet transmission and reception portion 10 has a packet reception portion 11, distribution portion 12, and packet transmission portion 13.

The packet reception portion 11 receives packet data transmitted from the terminal 200, each of the nodes 310 to 370, and the server 400.

The distribution portion 12 judges whether packets received by the packet reception portion 11 are user traffic packets or probe response packets (or probe packets), described below. The distribution portion 12 distributes user traffic packets to the user traffic extraction portion 20, and probe response packets and similar to the probe reception portion 40 (or, discards the packets). Distribution is performed using a protocol field and port number in the received packet data. Details are described below.

The packet transmission portion 13 transmits probe packets generated by the probe packet generation portion 30 to the terminal 200, the nodes 310 to 370, and the server 400 via the IP network 300. The above-described probe response packets are packets which are transmitted to the capture terminal 1 by a node 310 to 370 or similar which has received the probe packet.

The user traffic extraction portion 20 has an address extraction portion 21. The address extraction portion 21 extracts a transmission source address (Src address) and a destination address (Dst address) from the user traffic packet. The address extraction portion 21 outputs extracted transmission source addresses and similar to the probe packet generation portion 30.

The probe packet generation portion 30 has a packet generation portion 31, target definition table 32, and sequence value counter 33.

The packet generation portion 31 generates probe packets from transmission source addresses and destination addresses. The packet generation portion 31 references the target definition table 32, and when there is a combination of a matching transmission source address and destination address, generates the probe packet. The packet generation portion 31 references the sequence value counter 33, computes the probe packet sequence number, and stores the result in a prescribed field of the probe packet. Details are described below. The packet generation portion 31 outputs the generated probe packet to the packet transmission portion 13.

The target definition table 32 is a table which defines targets transmitting probe packets. Specifically, the addresses of targets (transmission destinations for probe packets) are stored in the target definition table 32.

The sequence value counter 33 is a counter which holds a value which is a base for sequence numbers. The sequence number is a number assigned to the probe packet to determine the target of the probe packet, to identify target redundancy, or to discriminate target redundancy when probe packets are transmitted with the same targets. Details are described below.

The probe reception portion 40 has a result storage portion 41 and a result storage database (DB) 42.

The result storage portion 41 classifies probe packets and probe response packets from the distribution portion 12, and stores the results in the result storage DB 42. As described below, entries are stored in the result storage DB 42 based on each packet, so that the investigated path state can be ascertained.

Next, operation of the capture terminal 1 is explained; first, however, an example of an IP packet which is the user traffic packet is explained.

Figure 3:
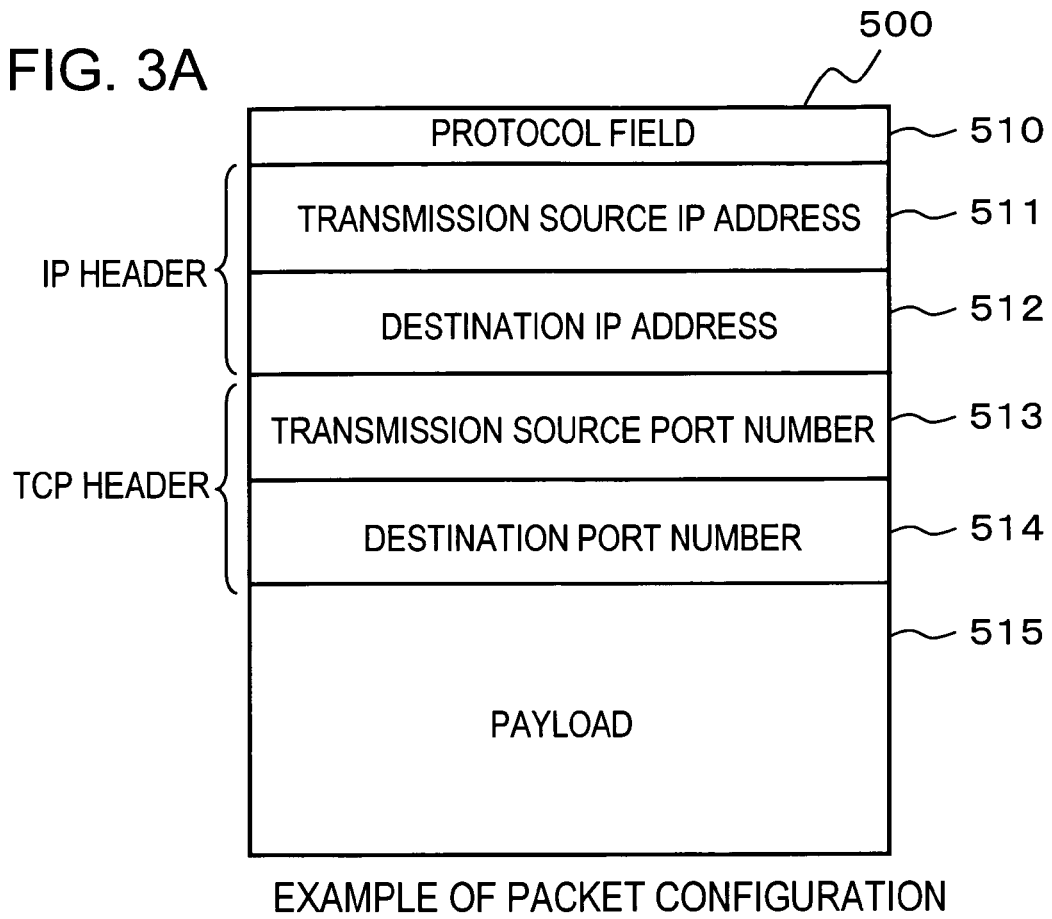
FIG. 3A shows an example of the configuration of an IP packet.
FIG. 3B shows an example of the configuration of a target definition table.

FIG. 3A shows an example of the configuration of an IP packet 500 received by the packet reception portion 11. The IP packet 500 has a protocol field 510, in which is stored data to identify the protocol; a transmission source IP address field 511 and destination IP address field 512, storing the IP addresses of the transmission source and destination respectively; a transmission source port number field 513 and destination port number field 514, storing the port numbers of the transmission source and destination respectively; and a payload 515, storing various data.

In the distribution portion 12 of the packet transmission and reception portion 10, packets are distributed; in the following example an HTTP packet is taken to be the user traffic packet. That is, the distribution portion 12 retrieves the transmission source port number and destination port number from the relevant fields 513, 514 of the received IP packet 500. When either of these numbers is "80" or "8080", then the distribution portion 12 judges the received packet to be the HTTP packet, and outputs the packet to the user traffic extraction portion 20.

After distributing the user traffic packet, the distribution portion 12 then performs probe packet and probe response packet distribution processing. That is, the protocol field 510 of the received IP packet 500 is retrieved, and when the field indicates that the packet is the probe packet or the probe response packet (ICMP packet), the distribution portion 12 outputs the received packet to the probe reception portion 40 as the probe packet or as the probe response packet.

Figure 4:
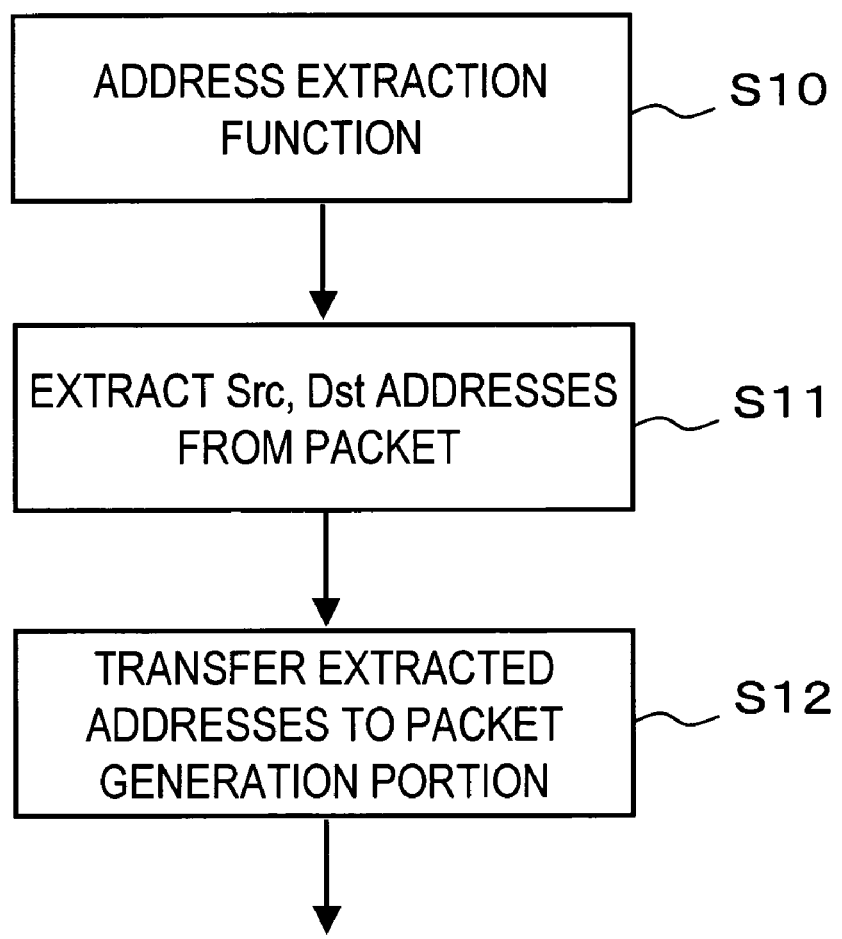
FIG. 4 is an example of a flowchart showing the operation of processing in a user traffic extraction portion.

FIG. 4 is an example of a flowchart of address extraction processing, executed by the user traffic extraction portion 20.

First, the user traffic extraction portion 20 initiates processing to execute the address extraction function (S10), and extracts the transmission source address (Src address) and destination address (Dst address) from the HTTP packet output from the distribution portion 12 (S11). Then, the extracted addresses are each output to the packet generation portion 31 of the probe packet generation portion 30 (S12). Processing of the address extraction function then ends.

Thereafter, the probe packet generation function is executed in the probe packet generation portion 30, based on the extracted addresses. FIG. 5 is an example of a flowchart of this processing.

In this embodiment, before execution of this function, the following processing is performed. First, the operator or similar stores the target in the target definition table 32. FIG. 3B is an example of the target definition table 32. As shown in the figure, the addresses of the server 400 and similar which are targets for probe packets are stored.

The operator or similar also sets in advance the number of hops for transmission of the probe packet. For example, the number is stored in memory or similar of the capture terminal 1. The number of hops for investigation is set, but the number will be different according to the scale of the network and other factors.

Further, the operator or similar initializes the sequence value counter 33 to an arbitrary value.

In this embodiment, the target definition table 32 is set to "*" (for all targets, that is, all HTTP packets passing through node 310), the number of hops to "5", and the initial value of the sequence value counter 33 to "1".

Returning to FIG. 5, when processing to execute the probe packet generation function is initiated (S20), the packet generation portion 31 initializes the TTL counter value to "0" (S21).

The TTL counter value is a value used to count the number of hops of the probe packet being transmitted. When generation of probe packets for the number of hops set in advance is completed, probe packet generation processing ends.

Next, the packet generation portion 31 references entries stored in the target definition table 32, and judges whether an address extracted by the user traffic extraction portion 20 exists in the target definition table 32 (S22). If the address does not exist in the target definition table 32 ("no" in S22), the probe packet generation function ends.

On the other hand, if the extracted address exists in the target definition table 32 ("yes" in S22), the packet generation portion 31 adds "+1" to the TTL counter value (S23). For the above settings, because "*" is set in the target definition table 32, the extracted address exists, and the TTL counter value becomes "1".

Next, the packet generation portion 31 performs processing to actually generate probe packets (S24, S25). By means of two processing steps, different probe packets are generated.

FIG. 6A and FIG. 6B show examples of probe packets. The probe packet 530 has a transmission source (Src) IP address field 532 and destination (Dst) IP address field 533 in which are stored the IP addresses for the transmission source and destination; a sequence number field 535 in which is stored the sequence number; and a TTL field 536 in which is stored the TTL counter value.

In the example shown, the probe packet shown in FIG. 6A is generated by the processing of S24, and the probe packet shown in FIG. 6B is generated by the processing of S25.

First, in the processing of S24, the packet generation portion 31 stores the destination address for the HTTP packet acquired by the user traffic extraction portion 20 in the probe packet destination IP address field 533. Further, the IP address of the capture terminal 1 itself is stored in the transmission source IP address field 532.

Then, the "sequence counter value×bias value (D)+TTL counter value" is stored in the sequence number field 535. For the above settings, the sequence counter value is "1", and due to S23 the TTL counter value is "1". If in this embodiment the bias value (D) is "100", then the sequence number is 1×100+1=101.

In the processing of S25, the packet generation portion 31 stores the transmission source address for the acquired packet in the destination IP address field 533 for still another probe packet 530. The transmission source IP address field 532 stores the IP address of the capture terminal 1 itself.

Then, the "sequence value counter×bias value (S1)+bias value (S2)+TTL counter value" is stored in the sequence number field 535. If the bias value (S1) is "100" and the bias value (S2) is "50", then the sequence number is 1×100+50+1=151.

Next, the packet generation portion 31 transfers the generated probe packets to the packet transmission portion 13 (S26). The two generated probe packets are transmitted to the network, but because the destination of one of the probe packets is the "acquired destination address", it is transmitted to the HTTP packet transmission destination (for example, the server 400).

The destination of the other probe packet is the "acquired transmission source address", and so this packet is transmitted to the HTTP packet transmission source (for example, the terminal 200).

Then, a judgment is made as to whether processing has been repeated for the preset number of hops (m hops) (S27). In the above-described example, the number of hops is "5", and so the above-described processing is repeated five times.

At the time of the second processing, as a result of S23 the TTL counter value becomes "2", and through the processing of S24 a probe packet with sequence number of 1×100+2=102 is generated. In the third processing, a probe packet with the sequence number 1×100+3=103 is generated. In this way, the sequence numbers of probe packets transmitted to the transmission destination of the user traffic packet (for example, the server 400) have numbers which are different for each packet.

On the other hand, the probe packet generated in the processing of S25 has the sequence number 1×100+50+2=152 in the second processing, and 1×100+50+3=153 in the third processing. In this way, probe packets transmitted to the transmission source (for example, terminal 200) of the user traffic packet also have different numbers. Further, the probe packets transmitted to the server 400 and the probe packets transmitted to the terminal 200 have different respective numbers, and the numbers are unique.

In the above-described example, the number of hops is "5" (=m), and so five of each type, for a total of ten probe packets, are generated (with different respective sequence numbers).

Returning to FIG. 5, when processing has been repeated m times ("yes" in S27), the packet generation portion 31 adds "+1" to the sequence value counter 33. Through this addition, the uniqueness of probe packets transmitted from the capture terminal 1 is further ensured.

That is, when "+1" is added to the sequence value counter 33, and still another HTTP packet is received, the sequence number of the probe packet generated in the processing of step S24 is "2×100+1=201", and in the second processing is "2×100+2=202". Even when compared with the sequence numbers of the probe packets generated in the initial processing, the numbers are unique.

Then, the generated probe packets are transmitted from the packet transmission portion 13. FIG. 7A shows an example of the configuration of the probe packet. Portions which are the same as in FIG. 6A are assigned the same symbols.

Upon receiving the probe packets 530, the nodes 310 to 370 and similar generate probe response packets and transmit these in succession to the capture terminal 1.

FIG. 7B shows an example of the configuration of a probe response packet 550. The overall configuration is similar to that of the probe packet 530. In the transmission source IP address field 552, the IP addresses of the nodes 310 to 370 are stored. In the destination IP address field 553, the IP address of the capture terminal 1 is stored.

When some time has elapsed after transmission of the probe packets, the packet reception portion 11 successively receives (or captures) probe response packets and probe packets.

Here, the probe packet is received by the packet reception portion 11 directly from the packet transmission portion 13, without the intervention of the nodes 310 to 370 or similar. This is because the packet transmission portion 13 and packet reception portion 11 use a loopback function. Such a loopback function is provided as standard in the interface comprised by the packet reception portion 11 and similar.

The distribution portion 12 distributes probe packets and probe response packets handled by the loopback function, and user traffic packets. As explained above, distribution is performed according to the value stored in the packet protocol field.

Figure 8:
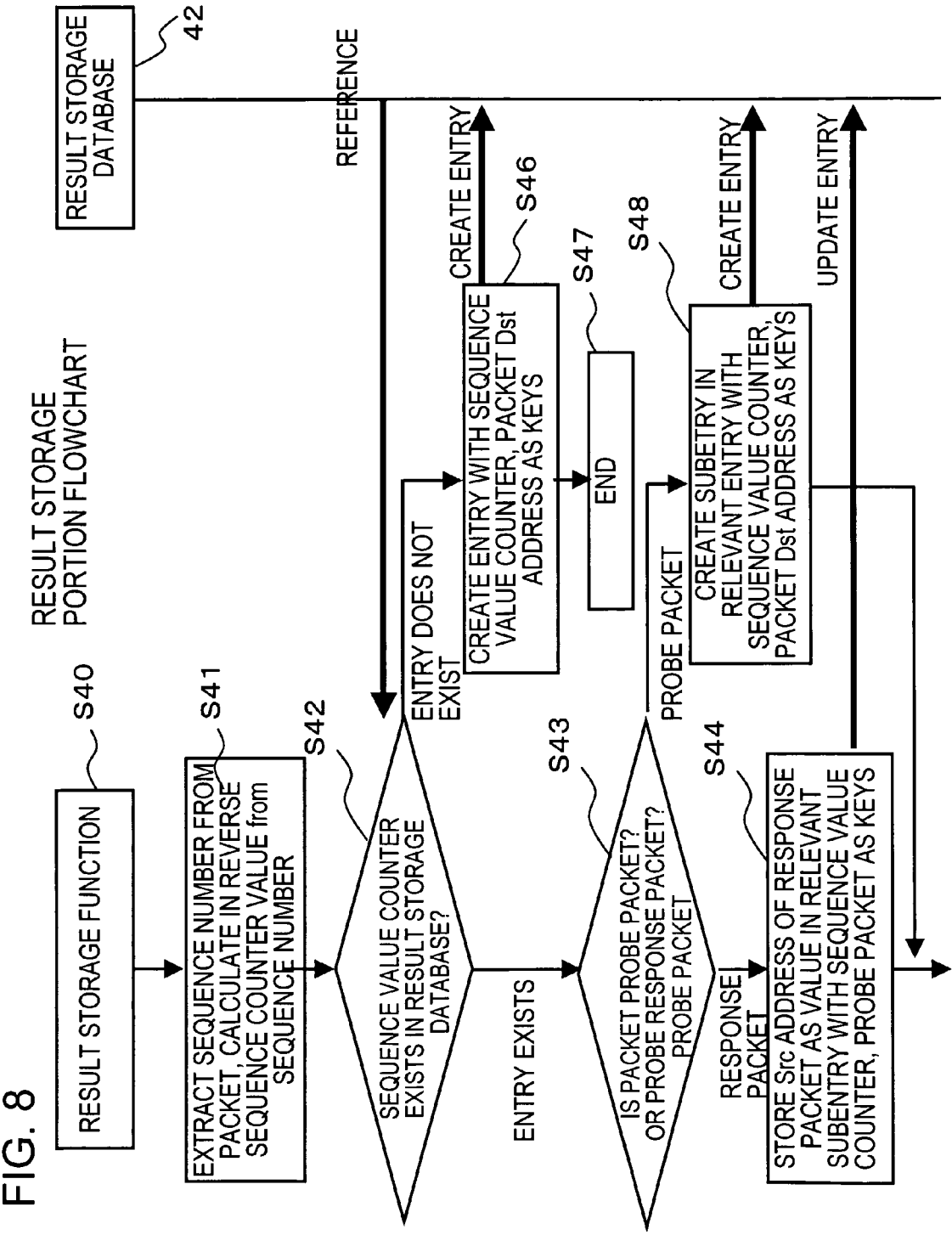
FIG. 8 is an example of a flowchart showing the operation of processing in a result storage portion.

The probe reception portion 40 executes processing of a result storage function for distributed probe packets and probe response packets. FIG. 8 is an example of a flowchart for processing in the result storage portion 41.

Upon initiating processing to execute the result storage function (S40), the result storage portion 41 extracts the sequence number from the packet (probe packet or probe response packet), and calculates in reverse the sequence counter value from the sequence number (S41).

In the above-described example, the decision can be made by checking the hundreds position of the sequence number. For example, when the sequence number is "101", it can be inferred that the sequence value counter is "1", and when the sequence number is "203", it can be inferred that the sequence value counter is "2".

Next, the result storage portion 41 judges whether there exists a preexisting entry in the result storage DB 42, using as keys the sequence value counter and the destination (Dst) address (S42).

By this means, it is possible to decide whether a received packet is a portion of a group of probe packets for path investigation some of which have already been received, or is a probe packet for path investigation which initiates a new investigation.

Figure 9:
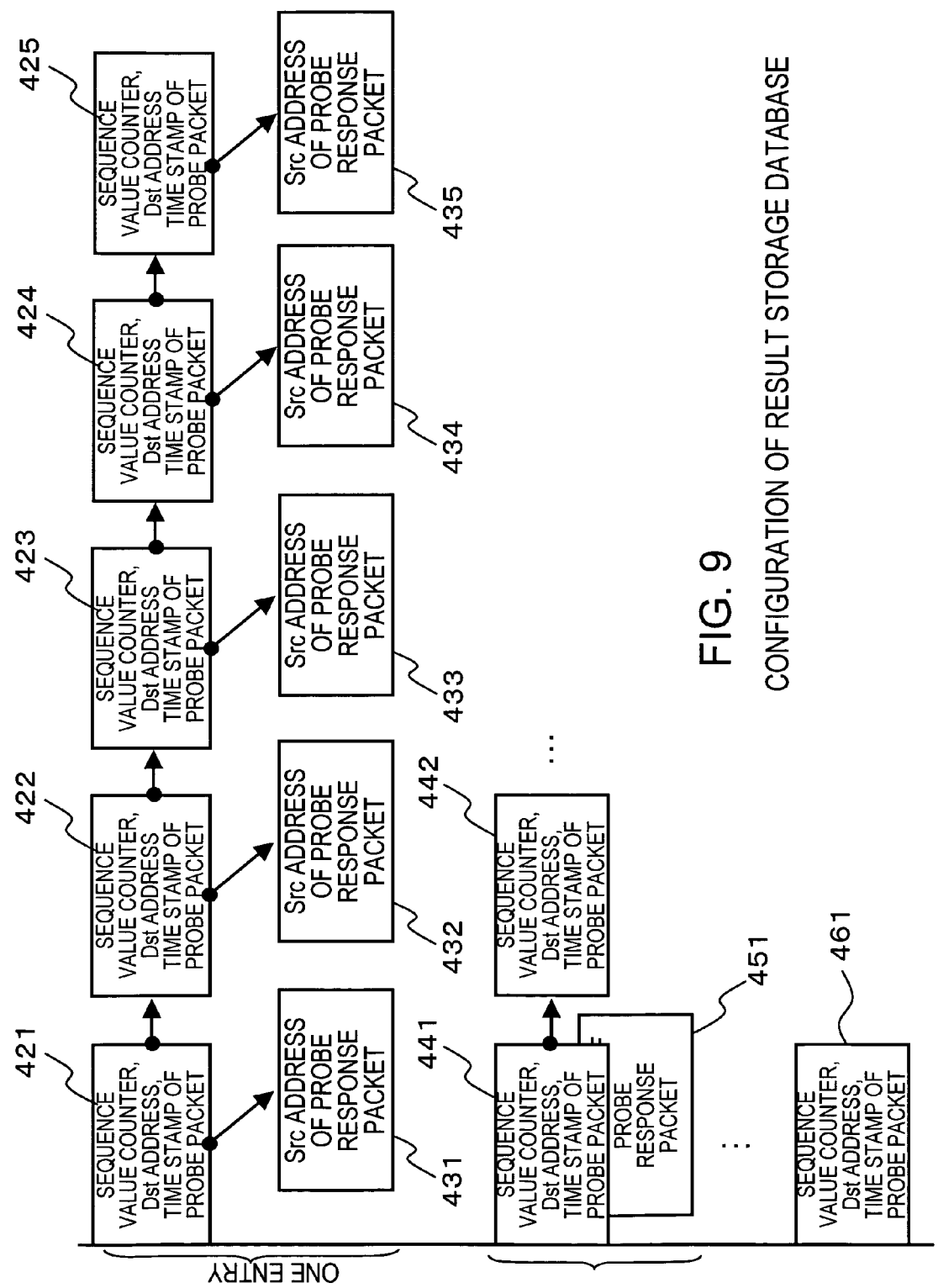
FIG. 9 shows an example of the configuration of a result storage database.

FIG. 9 is an example of the configuration of the result storage DB 42. One entry has subentries 421 to 425 based on the probe packet, and elements 431 to 435 of the subentries 421 to 425. The entries 421 to 425 and similar are arranged in TTL order. This result storage DB 42 is constructed according to the flowchart.

The probe packet for path investigation among packets already received is a packet for which any one of the subentries 421 to 425 exists in the result storage DB 42. The probe packet for path investigation which initiates a new investigation is a packet for which relevant subentries 421 to 425 or similar do not exist in the result storage DB 42.

Returning to FIG. 8, if the received packet is the path investigation probe packet which initiates the new investigation (when preexisting entries do not exist in the result storage DB 42; "no entries exist" in S42), the sequence value counter and the probe packet destination address are used as keys to add a new entry to the result storage DB 42 (S46). Then, processing of the result storage function ends (S47).

If on the other hand the received probe packet is the probe packet for the path investigation for which probe packets have already been received (when preexisting entries exist in the result storage DB 42; "entries exist" in S42), the result storage portion 41 judges whether the received packet is the probe packet or the probe response packet (S43).

This judgment can be made based on the field 554 storing a value indicating a request or a response, as indicated in FIG. 7A or FIG. 7B. For example, in the case of the probe packet, a "0" indicating the request is stored in this field 554, whereas in the case of the probe response packet, a "1" indicating the response is stored in this field 554, and so the value can be used in judgment.

In the case of the probe packet ("probe packet" in S43), the result storage portion 41 uses the sequence value counter and the received packet destination (Dst) address as keys to add subentries, in TTL order, to the relevant entry of the result storage DB 42 (S48).

In the example of FIG. 9, the processing and similar to further add the subentry 425 to the subentries 421 to 424 corresponds to this processing (S48).

On the other hand, in the case of the probe response packet ("response packet" in S43), relevant subentries exist in the result storage portion DB 42, and so the result storage portion 41 references the TTL and stores the transmission source (Src) address of the packet itself as the element in the relevant subentry (S44).

In the example of FIG. 9, processing to store the transmission source (Src) address of the probe response packet as the element 431 of the subentry 421 corresponds to this processing (S44). Then, the series of processing of the result storage function ends.

Each time the probe packet or probe response packet is received, the result storage portion 41 performs the above-described processing, and constructs the result storage DB 42. And, in the result storage DB 42 which is finally constructed, the transmission source (Src) addresses of the probe response packets are arranged in order. These transmission source addresses indicate the addresses of the nodes 310 to 370 and similar which have transmitted probe packets. Hence the transmission source addresses arranged in order in the result storage DB 42 indicate paths, and the paths are accumulated in the result storage DB 42.

Figure 10:
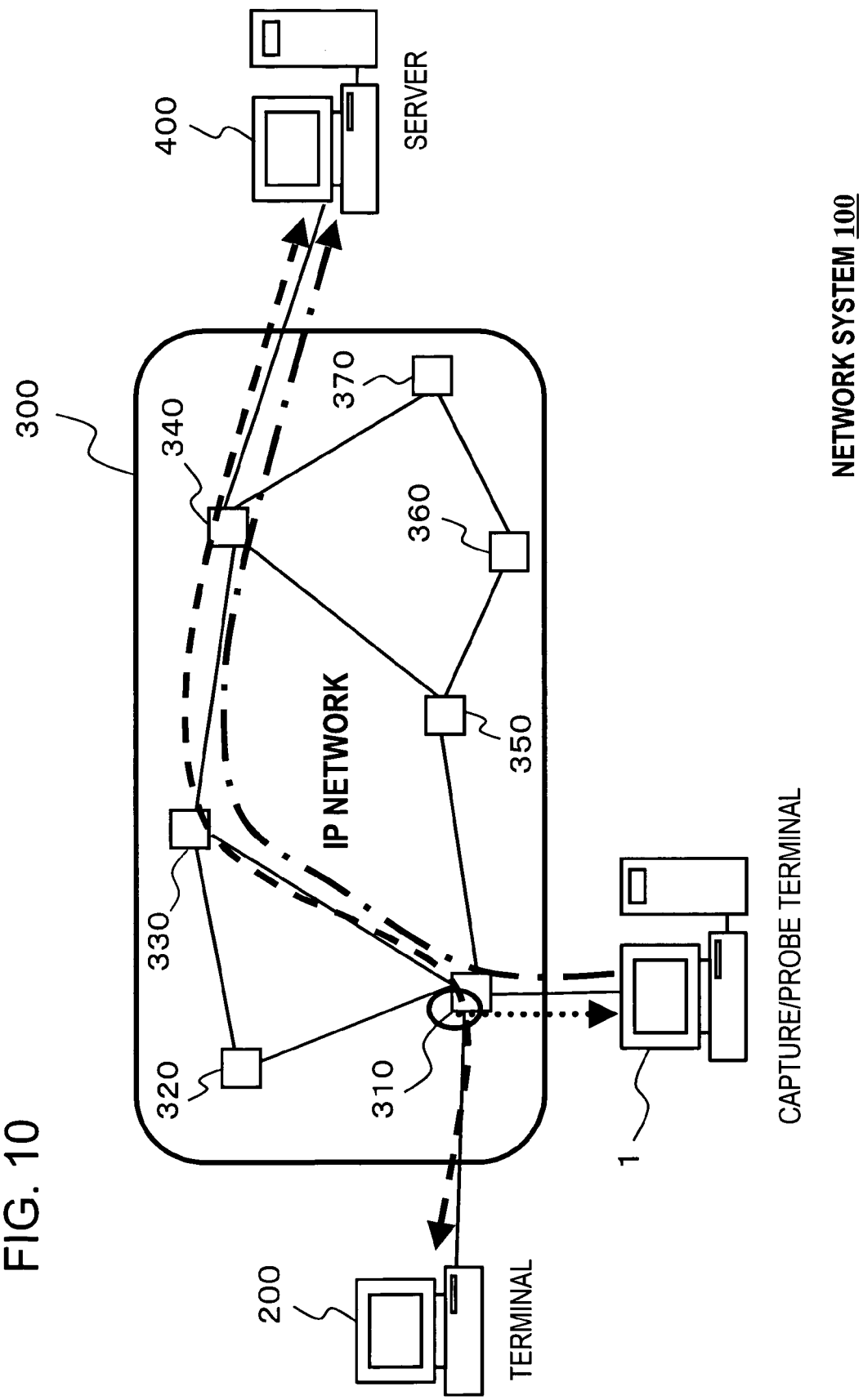
FIG. 10 shows an example of packet transfer in a network system.

FIG. 10 is a drawing used to explain the advantageous results of this Embodiment 1. When the user traffic packet is transmitted from the terminal 200 to the server 400 via nodes 310, 330, 340, the capture terminal 1 receives (captures) the packet passing through node 310.

Using the captured packet, the capture terminal 1 then generates the probe packet, the destination of which is the transmission destination (or transmission source) of the captured packet, and transmits the probe packet to the network. That is, the user traffic packet from the terminal 200 and the probe packet pass through node 310 substantially simultaneously, and are transmitted in succession over the same path. Thereafter the capture terminal 1, by receiving the probe response packet, stores the path in the result storage DB 42.

Hence in this Embodiment 1, it is possible to immediately acquire the path state according to user traffic. Further, there is no need for a network operator, operating the capture terminal 1, to perform a separate operation serving as a trigger to generate probe packets. Hence the path state can be acquired immediately, so that the path state at the time of fault occurrence can also be acquired immediately.

Figure 11:
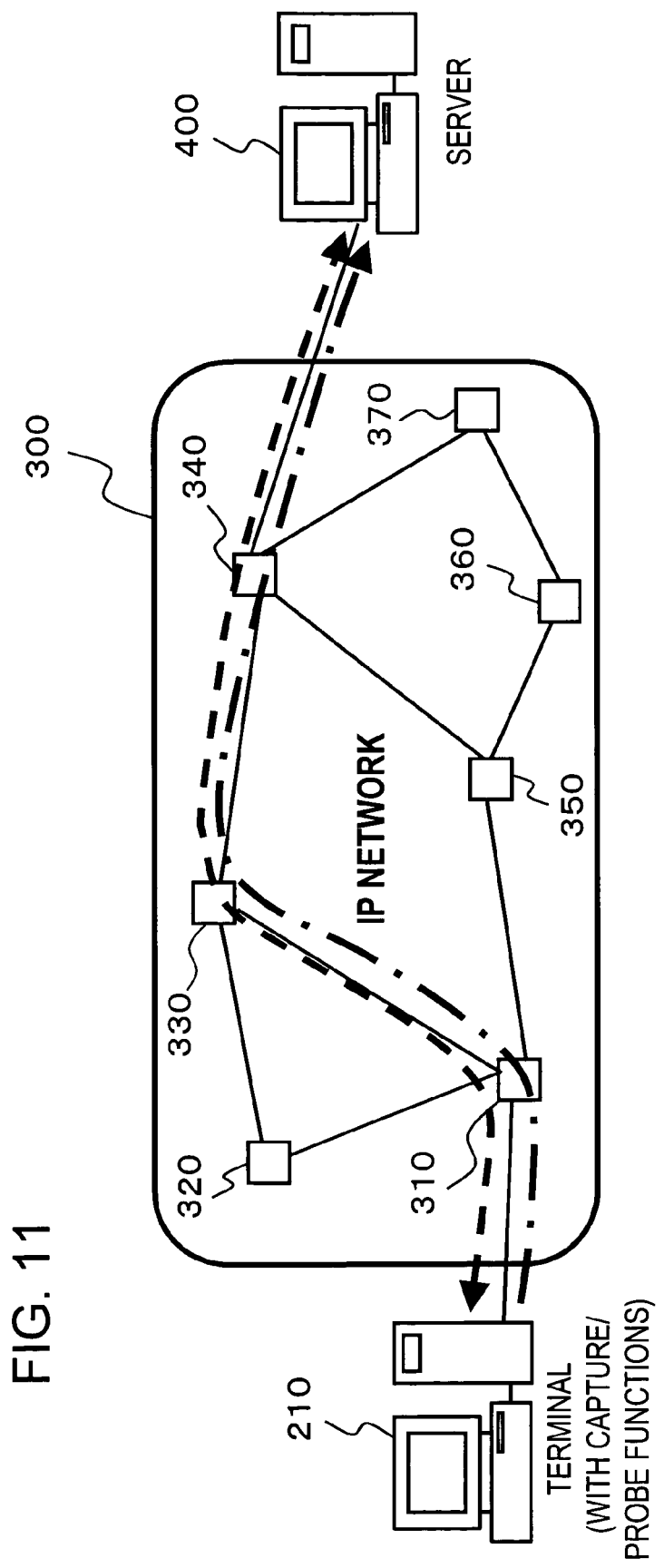
FIG. 11 shows an example of packet transfer in a network system.

In the above-described example, an example of the network system 100 having the capture terminal 1 was explained; however, a terminal 210 used by a user may have the functions of the above-described capture terminal 1. FIG. 11 shows an example of the configuration of a network system 100 in such a case.

In this case, the terminal 210 does not capture the traffic of numerous users flowing through the network, but instead captures traffic transmitted and received by the user himself (by the terminal 210 itself).

Further, probe packets are transmitted only to the destination addresses of user traffic. Because the transmission source address of user traffic is the address of the terminal 210, probe packets such as that in FIG. 6B, for example, are not generated or transmitted.

Further, path information accumulated in the result storage DB 42 is related to destinations accessed by the user (the server 400 having the destination address of user traffic and similar).

In this case also, similarly to the above-described example, through immediate acquisition of path information, path information at the time of fault occurrence can also be acquired.

(Embodiment 2)

Next, Embodiment 2 is explained. Embodiment 2 is an example in which previously stored path information is compared with newly extracted path information, and when there is a change, the network operator and user are notified of this fact.

Figure 12:
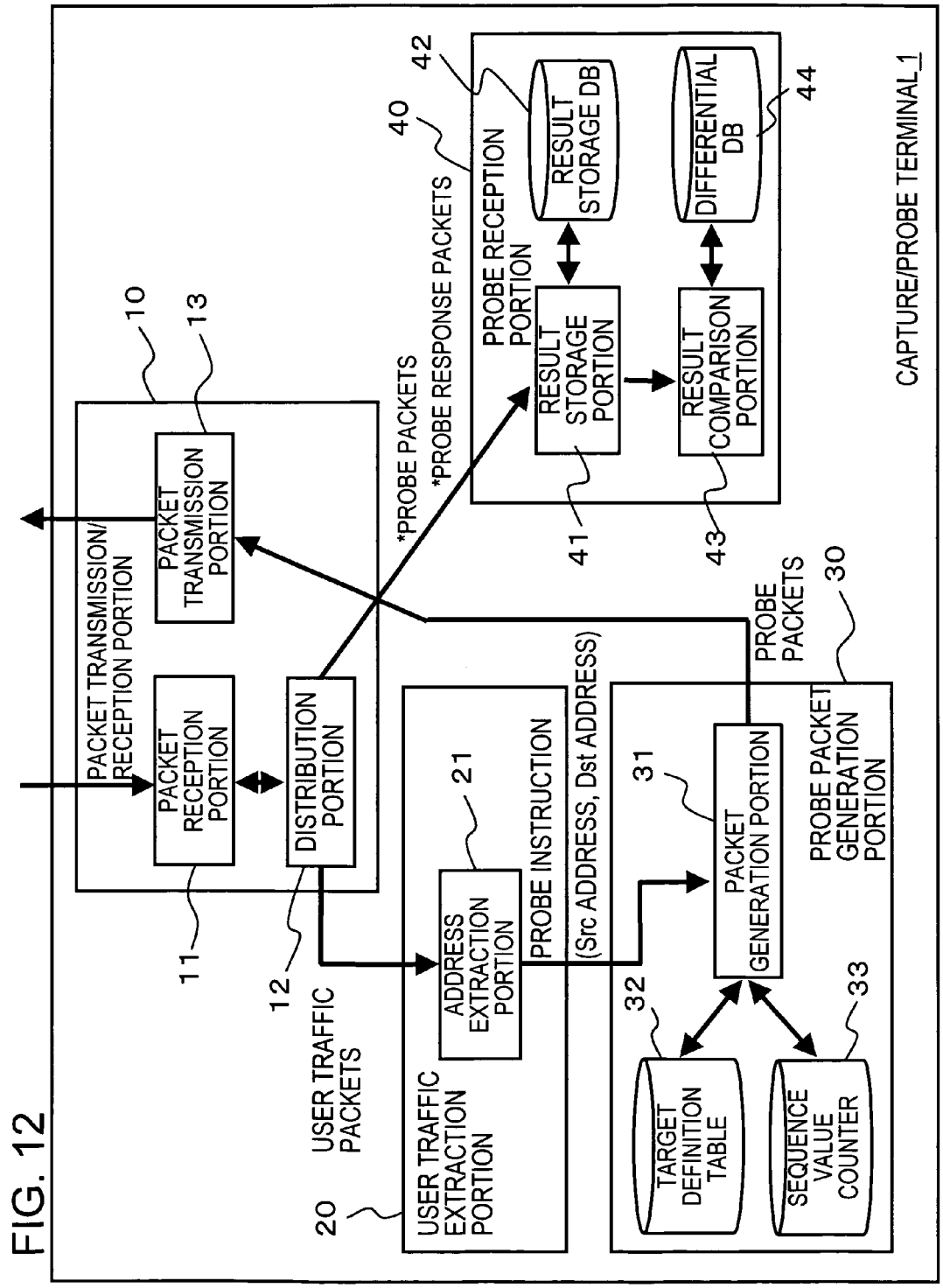
FIG. 12 shows an example of another configuration of a capture/probe terminal.

FIG. 12 is an example of the configuration of a capture terminal 1 to which Embodiment 2 is applied. Constituent components which are the same as in the capture terminal 1 of Embodiment 1 are assigned the same symbols. A difference is the provision, in the probe reception portion 40, of a result comparison portion 43 and differential database (DB) 44.

Figure 13:
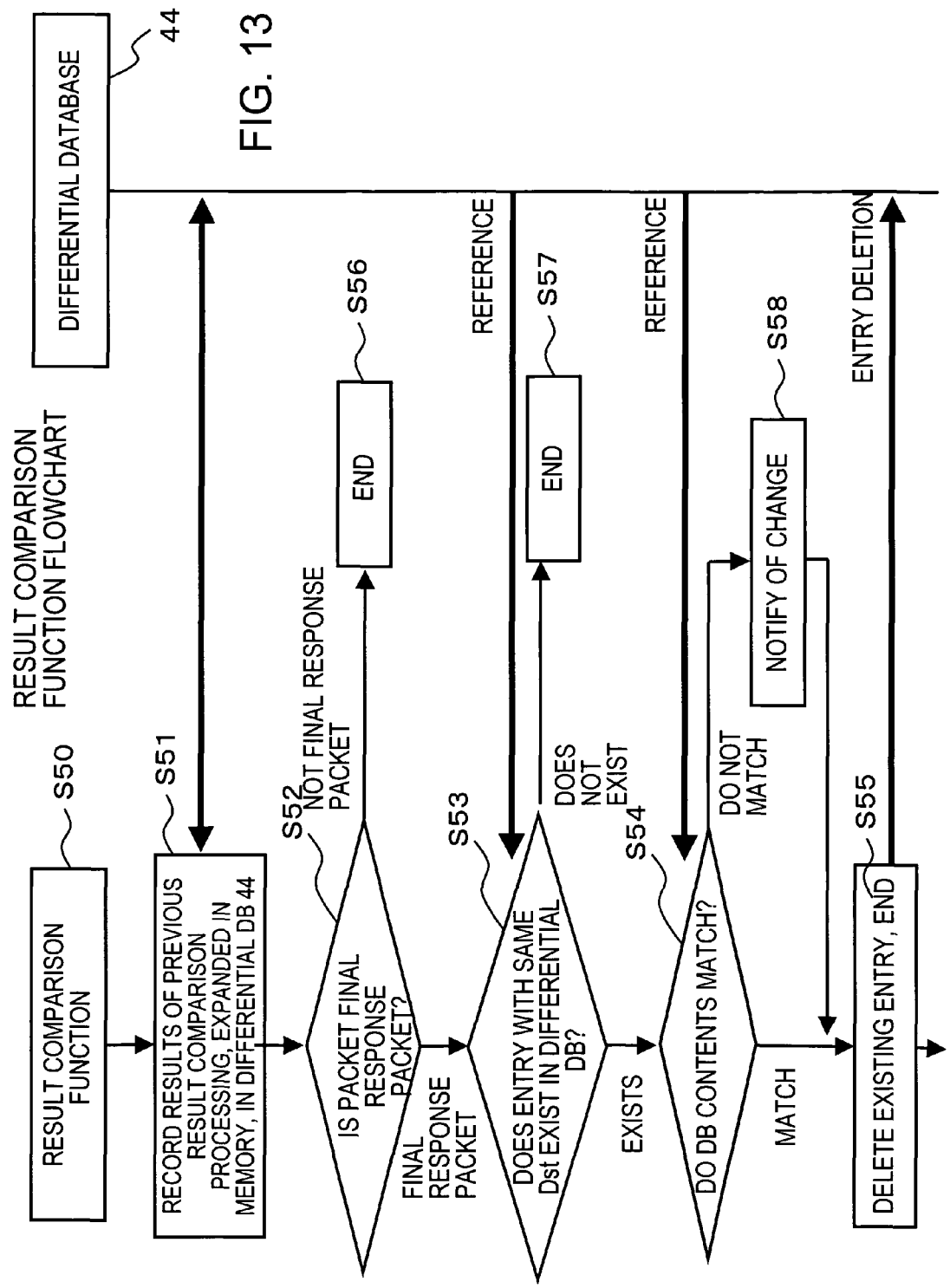
FIG. 13 is an example of a flowchart showing the operation of processing to execute a result comparison function.

The process until construction of the result storage DB 42 by the result storage portion 41 is similar to that in Embodiment 1. When processing of the result storage function (FIG. 8) is completed, processing to execute the result comparison function is initiated, and the network operator and user are notified of path changes. FIG. 13 is an example of a flowchart to execute the result comparison function.

The result comparison portion 43, upon initiating processing to execute the result comparison function (S50), records in the differential DB 44 the results (described below) expanded in memory in previous result comparison processing (S51). Then, similarly to processing for the result storage function (FIG. 8), the result storage portion 41 creates entries in memory for the packet (probe packet or probe response packet) similar to those of the result storage DB 42. Entries stored in memory are used in path comparisons through subsequent comparisons with the differential DB 44.

Next, the result comparison portion 43 judges whether the packet is a final response packet (S52). That is, a judgment is made as to whether the received packet (probe packet or probe response packet) is a response packet for the destination (Dst) address of the final hop.

This judgment is performed by judging whether the transmission source address of the received packet is the same as the destination (Dst) address of a probe packet for an entry in the differential DB 44. Or, because each of the nodes 310 to 370 and similar receiving probe packets stores the probe packets in the payload 557 of the probe response packet (see FIG. 7A and FIG. 7B), the destination addresses of probe packets stored in the payload 557 may be referenced and compared with entries in the differential DB 44. Or, if the value stored in the TTL fields 536, 556 of a received packet is for example "5" (the value initially set as the number of hops), then the packet may be judged to be the final response packet.

When the received packet is not a final response packet ("not final response packet" in S52), the result comparison processing ends (S56). This is because, until the final packet is received, subentries and elements within the same element are not all constructed, and the path comparison of subsequent processing cannot be performed.

When the received packet is a final response packet ("final response packet" in S52), the task of path comparison is actually performed. First, the result comparison portion 43 references the differential DB 44 and judges whether there exists in the differential DB 44 an entry with the same destination (Dst) address as the entry stored in memory (S53). This is performed in order to judge whether the path comparison investigation has been performed in the past for the same path.

When the entry with the same destination (Dst) address does not exist in the differential DB 44 ("does not exist" in S53), processing ends (S57). This is because the path is being investigated for the first time, and so a difference cannot be extracted.

When on the other hand the entry with the same destination (Dst) address exists in the differential DB 44 ("exists" in S53), the result comparison portion 43 compares all the contents of the differential DB 44 (sequence value counters, Src addresses and similar in entries) with the contents stored in memory, and judges whether the contents match the contents of the differential DB 44 (S54).

If there is even one difference in content ("does not match" in S54), then a difference exists in the paths, and so the result comparison portion 43 notifies the network operator or the user of the fact that there has been a change (S58).

Notification may for example be accomplished by having the result comparison portion 43 display, on a monitor or other display portion, information indicating that a change has occurred; or, the information may be recorded in a log in memory or elsewhere, together with the time of occurrence.

On the other hand, when there are no differences ("matches" in S54), or when there has been a difference and notification of a change has been given, the result comparison portion 43 deletes the existing entry in the differential DB 44, and processing ends (S55). By means of this processing and the recording, in the differential DB 44, of the above-described results expanded in memory (S51), new results are continuously preserved in the differential DB 44.

Thus in this Embodiment 2, when the change suddenly occurs in the path at a certain time, the contents of the differential DB 44 no longer match the contents stored in memory, and because the network operator and user are notified of this fact, the network operator and similar can ascertain path changes.

Until execution of processing of the result comparison function, processing similar to that of Embodiment 1 is executed, and so advantageous results of action similar to those of Embodiment 1 are obtained in Embodiment 2 as well.

In the above-described example, the result comparison portion 43 compares all of the contents of the differential DB 44 (S54 in FIG. 13); however, comparisons may also be made only of subentry elements. In the example of FIG. 9, comparisons may be made only of elements 431 to 435 and 451. This is because for the subentries 421 to 425, 441 and 442, and 461 of the differential DB 44 (with the same configuration as the result storage DB 42), regardless of whether there is the path change, the contents do not change; but when the path change occurs, the transmission source (Src) address of probe response packets changes. In this case, the result comparison portion 43 does not compare the entire contents, and so to this extent processing can be performed more quickly. Of course, advantageous results of action similar to those of the above-described example are obtained.

(Embodiment 3)

Next, Embodiment 3 is explained. This Embodiment 3 is an example in which transmission of redundant probe packets is prevented, and investigation of the network is performed so as to result in a low load.

In FIG. 2, the packet generation portion 31 generates the probe packet each time the extracted address is input from the address extraction portion 21. Redundant probe packets may be generated and transmitted to the network for the same address transmitted previously.

Hence in this Embodiment 3, transmission of redundant probe packets, as when transmitting probe packets to the same address, is prevented.

Figure 14:
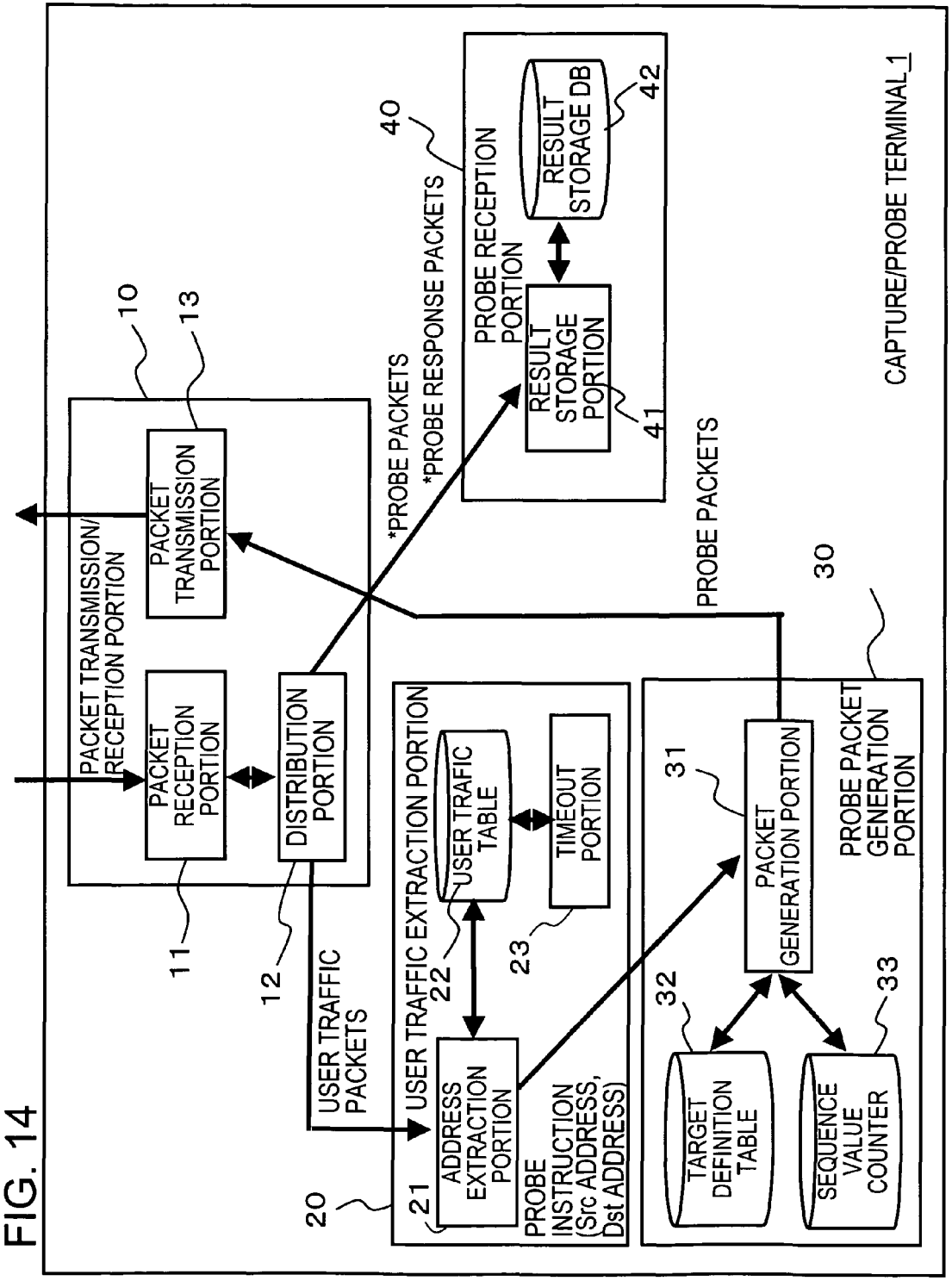
FIG. 14 shows an example of another configuration of a capture/probe terminal; and, FIG. 15 is an example of a flowchart showing the operation of processing to execute a redundant probe prevention function.

FIG. 14 shows an example of the configuration of the capture terminal 1 in Embodiment 3. A difference with Embodiment 1 (FIG. 2) is the provision, in the user traffic extraction portion 20, of a user traffic table 22 and a timeout portion 23.

The user traffic table 22 stores combinations of transmission source (Src) addresses and destination (Dst) addresses, extracted by the address extraction portion 21.

The timeout portion 23 deletes the entry stored in the user traffic table 22 when the time set by the network operator or similar has elapsed.

FIG. 15 is an example of a flowchart showing operation in processing to execute the redundant probe prevention function. Timeout processing is also added.

The address extraction portion 21 initiates processing to execute the address extraction function (S60), and extracts the transmission source (Src) address and destination (Dst) address from the user traffic packet (S61). Operation is similar to Embodiment 1.

Next, the address extraction portion 21 references the user traffic table 22 and judges, using the address combination, whether the entry exists or not (S62).

Address combinations for which probe packets have previously been sent are stored in the user traffic table 22. Hence the address extraction portion 21 searches using the destination address as a key, for example, and if a matching address exists, this means that the probe packet was previously transmitted.

Hence if the entry exists in the user traffic table 22 ("entry exists" in S62), the address extraction portion 21 discards the packet and ends processing (S63). In this case, the addresses are not output to the packet generation portion 31, and so the probe packet is not generated.

On the other hand, if the entry does not exist in the user traffic table 22 ("entry does not exist" in S62), the address extraction portion 21 creates a new entry which is the combination of the transmission source (Src) and destination (Dst) addresses (S64). At this time, the address extraction portion 21 simultaneously records the time at which the entry was created in the table (time stamp).

Then, the address extraction portion 21 outputs the addresses to the packet generation portion 31, and the probe packet is generated. Subsequent processing is similar to that in Embodiment 1.

In the timeout portion 23, a judgment is made as to whether the "time stamp" for the entry is n minutes before the current time (S71), using a time set in advance by the network operator or similar (n minutes: a timeout time set for example in memory). That is, the timeout portion 23 judges, from the time of the "time stamp", whether the "timeout time" has passed or not. Of course the units for the timeout time may be "seconds" rather than "minutes".

When the preset timeout time has passed ("yes" in S71), the timeout portion 23 deletes the relevant entry in the user traffic table 22 (S72). By this means, increases in the entries in the user traffic table 22 can be prevented.

On the other hand, when the predetermined timeout time has not passed ("no" in S71), or after the relevant entry has been deleted, the timeout portion 23 scans all entries in the table 22 (S73), and so continuously investigates whether the timeout time has passed.

For traffic packets which continue to be transmitted to the network even after the fixed time has elapsed, after entries are deleted, entries are again created in the table 22, and so transmission of probe packets can be continued.

Thus in this Embodiment 3, if the same address is recorded in the user traffic table 22, the probe packet is not generated and transmitted, so that transmission of redundant probe packets can be prevented, and investigations similar to those of Embodiment 1 can be performed with a lower load imposed on the network.

At this time, moreover, after the fixed time has elapsed the relevant entries are deleted from the user traffic table 22 to prevent increases in the number of entries, and in addition it is possible to continue investigation of traffic which continues even after the fixed time has elapsed.

This Embodiment 3 can also be implemented in the above-described Embodiment 2, and advantageous results of action similar to those of Embodiment 2 are obtained.

What is claimed is:

1. A management device which investigates path states in a network, the device comprising:
   a packet transmission and reception portion which receives traffic from the network;
   an address extraction portion which extracts address information from the received traffic; and
   a probe packet generation portion which generates one or more probe packets, one or each of the probe packets having a transmission destination that is same as the extracted address information, and
   wherein the packet transmission and reception portion transmits the generated one or more probe packets to the network, and receives one or more probe response packets for the one or more probe packets transmitted, respectively, and
   the probe packet generation portion generates one or more of the probe packets with a set number of hops for the one or more probe packets having the transmission destination that is the same as the extracted address information, and adds one of an identifier or respective identifiers to one or each of the probe packets.

2. The management device according to claim 1, wherein the address extraction portion stores the extracted address information, and when the stored information is the same as the address information extracted from the newly received traffic, the probe packet generation portion is not caused to generate the probe packet.

3. The management device according to claim 2, wherein the address extraction portion deletes the stored address information after a fixed length of time has elapsed.

4. The management device according to claim 1, wherein the identifier includes a unique sequence number for each target, which is the transmission destination of the probe packet, and a value indicating the number of hops for the probe packet to be transmitted.

5. The management device according to claim 4, wherein the result storage portion summarizes and saves the probe response packets for which the sequence number is the same, in the same entry.

6. The management device according to claim 5, wherein address information for the target to which the one or more probe packet is transmitted is included in the probe response packet, and the address information is included in the entry in the result storage portion.

7. The management device according to claim 1, further comprising a result storage portion which creates path information from one or more the probe response packets and stores the path information.

8. The management device according to claim 7, wherein the packet transmission and reception portion receives the one or more probe response packets, and in addition receives the one or more probe packets by means of a loopback function without transferring packets to the network; and
   the result storage portion creates the path information from the one or more probe response packets and from the one or more probe packets received by the loopback function.

9. A management device which investigates path states in a network, comprising:
   a package transmission and reception portion which receives traffic from the network;
   an address extraction portion which extracts address information from the received traffic;
   a probe packet generation portion which generates one or more probe packets having a transmission destination that is same as the extracted address information; and
   a result storage portion which creates path information from probe response packets and stores the path information, and
   wherein the packet transmission and reception portion transmits the generated one or more probe packets to the network, and receives the one or more probe response packets for the one or more probe packets respectively,
   the probe packet generation portion generates one or more of the probe packets with a set number of hops for the one or more probe packets having the transmission destination that is the same as the extracted address information, and adds one of an identifier or respective identifiers to one or each of the probe packets, and
   the result storage portion compares first path information which is been stored with second path information created from newly received one or more probe response packets, and detects changes in the paths of the traffic transferred over the network.

10. A management method which investigates path states in a network, comprising:
receiving traffic from the network;
extracting address information from the received traffic;
generating one or more probe packets, one or each of the probe packets having a transmission destination that is same as the extracted address information; and
transmitting the generated one or more probe packets to the network, and receiving one or more probe response packets for the probe packets, respectively, and
wherein the probe packet generation portion generates one or more of the probe packets with a set number of hops for the one or more probe packets having the transmission destination that is the same as the extracted address information, and adds one of an identifier or respective identifiers to one or each of the probe packets.

11. A network system, comprising:
a terminal;
a server; and
a management device, and
wherein the terminal and server are connected via a network, and the management device which investigates path state in the network is connected to the network,
the management device includes:
 a packet transmission and reception portion which receives traffic transferred from the terminal to the server,
 an address extraction portion which extracts address information from the received traffic; and
 a probe packet generation portion which generates one or more probe packets having a transmission destination that is same as the extracted address information,
 the packet transmission and reception portion transmits the generated one or more probe packets to the network, and receives one or more probe response packets for the one or more probe packets, respectively, and
wherein the probe packet generation portion generates one or more of the probe packets with a set number of hops for the one or more probe packets having the transmission destination that is the same as the extracted address information, and adds one of an identifier or respective identifiers to one or each of the probe packets.

12. A management method which investigates path states in a network, comprising:
receiving traffic from the network;
extracting address information from the received traffic;
generating one or more probe packets having a transmission destination that is same as the extracted address information;
transmitting the generated one or more probe packets to the network, and receiving one or more probe response packets for the one or more probe packets, respectively;
creating path information from one or more probe response packets and stores the path information; and
comparing first path information which is stored with second path information created from newly received one or more probe response packets, and detecting changes in the paths of the traffic transferred over the network, and
generating one or more of the probe packets with a set number of hops for the one or more probe packets having the transmission destination that is the same as the extracted address information, and adds one of an identifier or respective identifiers to one or each of the probe packets.

\* \* \* \* \*